(12) United States Patent
Canton et al.

(10) Patent No.: US 10,277,522 B1
(45) Date of Patent: Apr. 30, 2019

(54) AUTOMATED ASSOCIATION OF COMPUTING RESOURCES WITH RESOURCE CREATORS FOR USAGE ALLOCATION

(71) Applicant: Amazon Technologies, Inc., Seattle, WA (US)

(72) Inventors: Jeffrey Cicero Canton, Seattle, WA (US); Prasad Krishnan, Seattle, WA (US); Harshad Vasant Kulkarni, Redmond, WA (US); Colin Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 14/555,306

(22) Filed: Nov. 26, 2014

(51) Int. Cl.
*H04L 12/911* (2013.01)
*H04L 12/26* (2006.01)

(52) U.S. Cl.
CPC .............. *H04L 47/70* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 2007/0156842 A1* | 7/2007 | Vermeulen | G06F 17/30212 709/217 |
| 2008/0140679 A1* | 6/2008 | Deyo | G06F 17/30867 |
| 2011/0126281 A1* | 5/2011 | Ben-Zvi | G06F 21/6218 726/21 |
| 2011/0320605 A1* | 12/2011 | Kramer | H04L 41/0843 709/226 |
| 2012/0016681 A1* | 1/2012 | Joergensen | G06F 9/5011 705/1.1 |
| 2012/0179646 A1* | 7/2012 | Hinton | G06F 17/30557 707/607 |
| 2012/0260303 A1 | 10/2012 | Wollnik et al. | |
| 2013/0018920 A1 | 1/2013 | Griffin | |
| 2013/0160072 A1 | 6/2013 | Reus et al. | |

(Continued)

OTHER PUBLICATIONS

Office action for U.S. Appl. No. 13/633,555, dated Aug. 1, 2014, Barclay et al., "Tag-Based Resource Configuration Control", 9 pages.

*Primary Examiner* — Sargon N Nano
*Assistant Examiner* — Christopher B Robinson
(74) *Attorney, Agent, or Firm* — Lee & Hayes, P.C.

(57) ABSTRACT

In a network-based services platform, customer resources may be automatically associated with a resource creator. Upon receipt of a request to create a computing resource, the computing resource may be created and thereafter executed within the network-based services platform. In response to the request, an entity associated with the request may be identified. In response to the identification of the entity, the computing resource may be automatically associated with the identified entity specifying the entity as the creator of the computing resource. In some embodiments, a cost of operating the resource over a period of time may be calculated, and the cost allocated to the identified entity based at least in part on the creator-to-resource association that was automatically generated upon creation of the resource. In this manner, a usage allocation report may be provided to the customer that shows the cost associated with the entity.

19 Claims, 7 Drawing Sheets

(56) References Cited

U.S. PATENT DOCUMENTS

2014/0201017 A1* 7/2014 Catalano ............... G06F 8/36
  705/26.1
2014/0324650 A1* 10/2014 Bligh ................ G06Q 20/14
  705/34
2015/0312421 A1* 10/2015 Leennet ............... H04W 4/70
  379/114.03

* cited by examiner

AUTOMATED ASSOCIATION OF COMPUTING RESOURCES WITH RESOURCE CREATORS FOR USAGE ALLOCATION

BACKGROUND

Large-scale, network-based computing represents a paradigm shift from traditional client-server computing relationships. With large-scale, network-based service platforms (e.g., data centers), customers are able to leverage shared resources on demand by renting resources that are owned by third parties and that reside "in the cloud." With these resources, users of the platform are able to launch and maintain large applications without actually owning or servicing the underlying infrastructure necessary for these applications. As a result, network-based service platforms have expanded the class of individuals and companies able to effectively compete in the realm of computing applications.

Renting computing resources that reside "in the cloud" comes at a cost to the customer. Accordingly, a customer may receive a bill at the end of a billing period that summarizes their metered usage and/or cost of operating the customer's resources over the billing period. However, the cost is often billed at the customer level and does not break down the cost below the customer level, such as across responsible individuals or groups of individuals (e.g., departments) that make up the customer's organization. Customers have implemented manual tagging strategies and/or ad hoc scripts to split the resource usage and/or cost of their bill across responsible entities, but this leads to computing resources being "untagged" indefinitely (e.g., users forget to tag their resources), or at least for a period of time immediately following the creation of the computing resource. This, in turn, results in an inability to effectively allocate the usage and/or cost of operating computing resources to responsible entities that created them.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems, devices, and techniques for automatically associating computing resources with the creators of those resources. The identified resource creator may be an explicit creator or an implicit creator of the resource. An explicit creator may be an entity that explicitly requested creation of the resource. An implicit creator may be an entity that can be associated with a programmatic request to create the resource. In the "implicit creator" scenario, the designation of "resource creator" may be imputed to the identified entity, even though the entity may not have explicitly requested creation of the resource.

The computing resources may be implemented in conjunction with online or network-accessible services, such as those offered by large-scale computer infrastructure providers. Such computing resources may include physical and/or virtual computers and servers, data storage resources, processors, functional units, services, etc. Customers of a computer infrastructure provider may subscribe to the provider's services and create a customer account that specifies one or more entities of the customer. The entities specified in the customer account may be able to create, use, and/or manage resources within a network-based services platform, whereby the entities act as an agent of the customer when using the customer's account.

Upon receipt of a request to create a computing resource, the computing resource may be created and thereafter executed within the network-based services platform. Additionally, in response to the resource creation request, an entity associated with the request may be identified. As mentioned above, the resource creation request may have been explicitly provided by the identified entity, or a programmatic entity may have initiated the request on behalf of the customer. In the latter case, a customer-entity associated with that programmatic request may be determined. In response to the identification of the entity, the entity may be automatically associated with the computing resource by specifying the identified entity as the creator of the computing resource. This automated creator-to-resource association may be maintained within the network-based services platform for retrieval by various downstream components and functions.

In some embodiments, the computing resource may be metered as it executes within the network-based services platform, and a usage of the resource over a period of time may be determined. The usage of the resource may then be allocated to the identified entity based at least in part on determining that the entity is associated with the computing resource as the creator of the computing resource. In this manner, a usage allocation summary may be reported to the customer that shows the usage of the resource in association with the entity.

By automatically associating computing resources, upon their creation, with an identified resource creator, a customer is able to allocate usage back to individual entities (e.g., users, applications, and/or groups of users (e.g., departments)) within the customer's organization. This creator-to-resource association may act as a default manner of automatically allocating usage of resources across entities of a particular customer. Moreover, the customer can be assured that usage will be allocated from the moment a resource is created, eliminating any period of time for usage to go unallocated with respect to a given resource. With this functionality, the customer can perform various downstream tasks, such as auditing usage of computing resources, reselling computing resources to third party customers, and so on.

Figure 1:
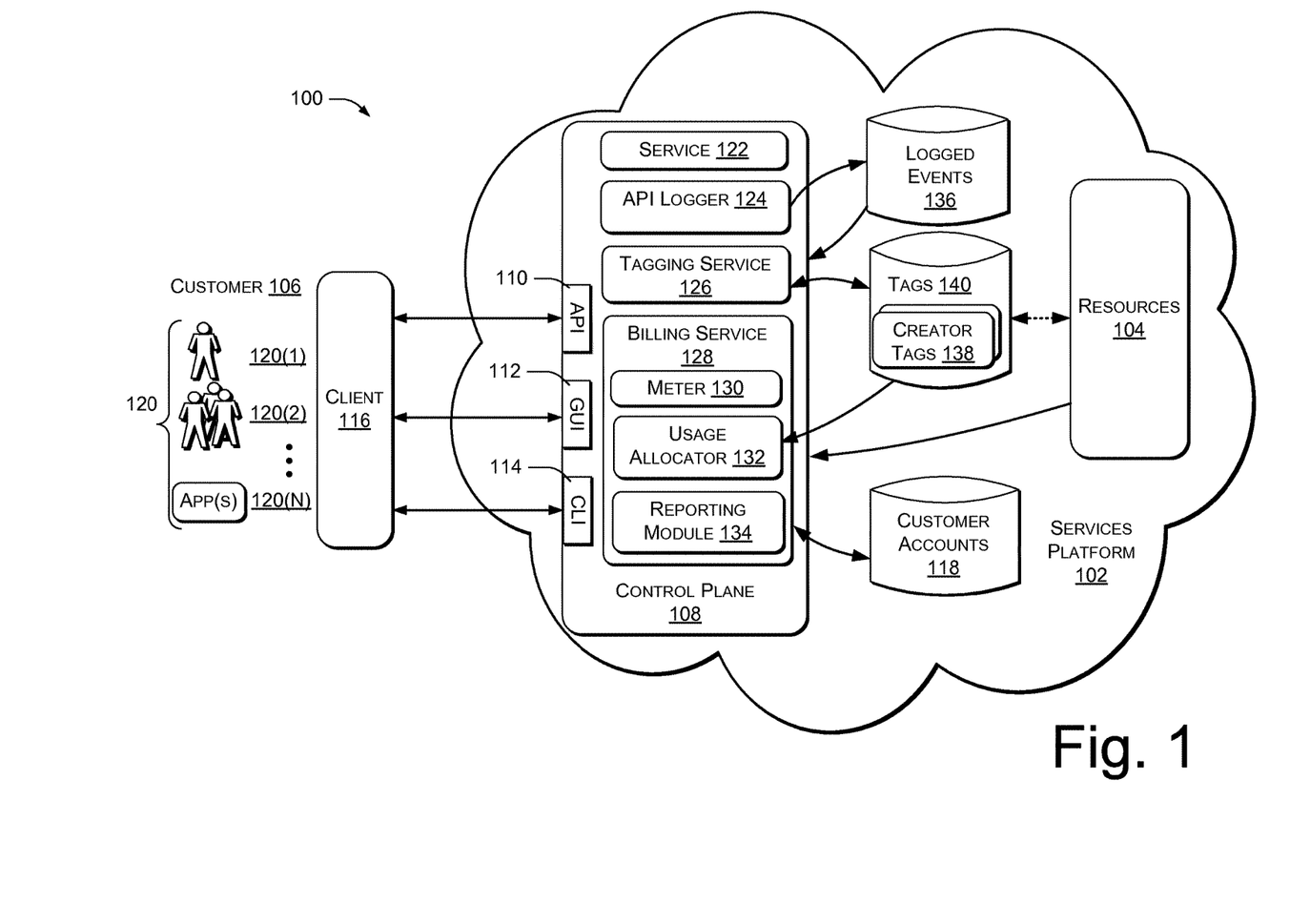
FIG. 1 is a block diagram illustrating an example online services environment in which resource creators may be automatically associated with resources for allocating resource usage to resource creators.

FIG. 1 illustrates an environment 100 for automatically associating resources with respective resource creators and allocating the usage of the resources to the associated resource creators. The environment of FIG. 1 includes a network-based services platform 102, which may provide a wide variety of computing resources 104. The network-based services platform 102 may be sometimes referred to as Infrastructure as a Service (IaaS), Platform as a Service (PaaS), a network-based infrastructure, and/or an online services platform. The resources 104 supported or provided by the network-based services platform 102 may include dedicated servers, shared servers, virtual servers, server slices, processors, processor cycles, storage, memory, and so forth. In some cases, the resources 104 may be available in scalable increments or amounts, which can be dynamically increased or decreased in response to usage and/or demand. Service fees may be tied to the amount of the resources 104 that are actually used.

The resources 104 provided and supported by the services platform 102 may also include functional elements or services. Functional elements or services may comprise applications or sub-applications that are used as building blocks for customer or developer applications. For example, the services platform 102 may provide predefined database functionality in the form of a discrete service that can be instantiated on behalf of a customer 106. Functional components may relate to network communications and other services or activities. Network-related services may, for example, include firewalls, load balancers, filters, routers, and so forth. Additional functional components may be available for such things as graphics processing, language translation, searching, etc.

The various services and functionality provided by the services platform 102 may be exposed to a customer 106 through various forms of network-based interfaces, which in FIG. 1 are represented as being implemented by a control plane 108. The control plane 108 may expose application programming interfaces (APIs) 110 that can be programmatically accessed by remote or external devices and users to establish and configure many of the services and functionality provided by the services platform 102. The APIs 110 may be designed to support various client functions and communications, and may be accessible through local-area or wide-area networks, including the Internet. The control plane 108 may also, or alternatively, expose a graphical user interface (GUI) 112 and/or a command-line interface (CLI) 114 for interactive access by users of the services platform 102. For example, the GUI 112 may comprise an Internet-based web server or hypertext-markup-language (HTML) server, which may in turn implement a network-accessible website.

A customer 106 may communicate with the services platform 102 from a client 116, such as a computer, a mobile device, or other equipment. In some cases, the client 116 may interact programmatically with the APIs 110 of the control plane 108. For example, the client 116 may execute one or more programs that issue network-based API calls to the control plane 108 specifying desired actions or queries to be implemented by the services platform 102. In other cases, the client 116 may implement a graphical browser, such as an Internet browser, through which a user may access the services of the services platform 102. More specifically, such a browser may communicate with the GUI 112 of the control plane 108 in response to interactive instructions, selections, and data entry by the user.

The services platform 102 may maintain customer accounts 118 for customers 106 that register for, or subscribe to, one or more services provided via the services platform 102. In general, the customer 106 may represent an individual and/or a business or organization. Accordingly, the customer 106 may be comprised of one or more of individuals (e.g., employees), and the customer 106 may utilize its own resources, such as applications, computing devices, and so on, which may access the services platform 102 programmatically. These individual people and/or applications, (and/or groups of individuals and/or applications) that make up the constituent parts of the customer 106 may be referred to as "entities" 120(1), 120(2), . . . , 120(N) (collectively 120). For example, entity 120(1) may represent an individual user, such as an individual running his/her own company. In other cases, the entity 120(1) may be one of a plurality of entities 120 associated with the customer 106 (e.g., one of multiple employees). As another example, the entity 120(2) may represent a group of individuals (e.g., a department within an organization). As yet another example, the entity 120(N) may represent one or more applications that are configured to programmatically access the services platform 102 to create, use, and/or manage the resources 104 on behalf of the customer 106.

Under its customer account 118, the customer 106 may create unique user identities for individual ones of its entities 120 so that the entities 120 can be granted permissions to interact with the services platform 102 under the customer account 118. The user identities may, at least in part, act as credentials that allow the entity 120 to "sign-in" to the customer account 118 and thereafter create, use, and/or manage the resources 104 in the name of the customer 106.

Different ones of the entities 120 may have different levels of permissions or access to the services platform 102 (e.g., administrative permissions, limited/restricted user permissions, etc.). In some embodiments, the customer 106 may temporarily delegate, to individual ones of its entities 120, access to the services platform 102 by creating "roles" for those entities 120, wherein the roles allow the services of the platform 102 to return temporary security credentials to the entity 120. For example, an entity 120(1) may represent a federated user having a user identity that was created outside of the services platform 102, and the federated user may be temporarily delegated access to the services platform 102 via a role created for the federated user.

In some embodiments, each customer account 118 may contain various information and data for a particular customer 106, such as the aforementioned unique user identities corresponding to the various entities 120 of the customer, usernames for individual entities 120, additional credentials and/or security tokens (e.g., passwords, personal identification numbers (PINs), etc.), contact information (e.g., electronic mail (e-mail) addresses, phone numbers, physical addresses, etc.) of the customer 106 and/or the individual entities 120, resource usage statistics of the customer 106 (i.e., usage history for the customer 106), customer-specific billing metrics, and so on.

The control plane 108 may provide one or more services, which are represented in FIG. 1 by the service 122. The service 122 may be configured to operate individual resources 104 on behalf of the customer 106. For example, the service 122 may represent a database service that allows for the operation of a database resource 104 within the services platform 102. As the database resource 104 is used by the customer 106, the customer may be charged a service fee, which may be based on the amount that the resource 104 was used. Over a billing period, these charges may be tracked and the cost of operating the resource 104 may be reported to the customer 106 (e.g., in a detailed billing report).

In order to allocate the usage and/or cost of operating resources 104 to individual ones of the entities 120, the control plane 108 may further implement a number of additional components and/or services, including an API tracker 124, a resource tagging service 126, and a billing service 128. The billing service 128 may further include a meter 130 that is configured to meter the computing resources 104 as they execute within the network-based services platform. The metering may be based on any suitable metric, such as a time period (e.g., measured by a clock or counter) that a resource 104 is used, an amount of data consumed as a result of using of the resource 104, and so on. The meter 130 may also be configured to calculate a cost of operating the resource 104 that is based on a rate (e.g., dollars per hour, dollars per Gigabyte (GB), etc.) or any other type of service fee that can be applied to the resource 104 based on usage metrics.

The billing service 128 may further include a usage allocator 132 that is configured to allocate usage of the resources 104 determined by the meter 130 to an individual entity 120 (or entities 120), and/or across various business dimensions (e.g., projects, cost centers, departments, etc.). In some embodiments, the cost of operating the resource 104 may be allocated to an individual entity 120. A reporting module 134 may then provide a usage allocation report to the customer 106 via any suitable channel. For example, the customer 106 may access the usage allocation report via the GUI 112. Additionally, the customer 106 may receive a notification of the usage allocation report, or may receive the usage allocation report itself, via an electronic messaging system (e.g., e-mail, short message service (SMS) text, and so on). In some embodiments, the usage allocation report may present the cost allocated to an entity 120 that was identified as a creator of a resource 104 in question.

In order to allocate usage to a particular entity 120, the billing service 128 may be configured to access or otherwise retrieve information or data that indicates an association between the entity 120 and the resource 104 in question. A determination of this association may be accomplished in various ways. In some embodiment, the API tracker 124 may be utilized to provide this information to the billing service 128 directly and/or via the tagging service 126. For example, the API tracker 124 may continually track API calls made under each of the customer accounts 118, and may record the API calls as logged events 136 in a data repository. Individual API calls can be logged in any suitable format, such as JavaScript Object Notation (JSON), or any other data-interchange format, and the logged events 136 may be organized and maintained in the form of log files or any other suitable data record format suitable for retrieval by the billing service 128 and/or the tagging service 126.

In one illustrative example, a request to create a new database resource 104 that is offered by a database service 122 may be submitted. The request may be issued from the client 116 as a result of a human entity 120 providing input via the GUI 112 or the CLI 114, or it may be issued by a programmatic entity running on the client 116 or in the services platform 102. In some embodiments, the request issued from the client 116 may cause the calling of a series of services, such as the service 122, before the requested resource 104 is actually created. That is, a first service 122 may initially receive a resource creation request from the client 116, and the first service 122 may then call a second service, which may call a third service, and so on, until a terminal service creates the resource 104 in question. Regardless of the manner in which the request is submitted, a resource creation API may be invoked based on the request, which can be tracked by the API logger 124. For example, in response to an invocation of the resource creation API, the service 122 may create a log entry that is transmitted to the API logger 124 and recorded as a logged event 136, which, in this case, is a "resource creation" type of event. The log entry may include a unique user identity or other type of identifier of an entity 120 that is associated with the resource creation request. For instance, if the entity 120(2) represents a group of individuals with a user name "Team A" and a unique user identity "433775394192," the log entry may specify that Team A (e.g., "user identity"="433775394192") created the database resource 104 in question. It is to be appreciated that the API logger 124 may log other types of events other than resource creation events, including, without limitation, resource termination events, or other events that can be associated with other types of API calls. As such, the logged events 136 may contain various types of events, including, but not limited to, resource creation events.

The logged events 136 may be periodically read out by a component or service of the services platform 102 in order to extract the identity information from the resource creation events. In some embodiments, this extraction may be effected by push notifications issued from the API logger 124. One suitable implementation for managing push notifications in the services platform 102 is Simple Notification Service (SNS), commercially available from Amazon® Technologies, Inc. The push notifications may be received by the tagging service 126 or the billing service 128, depending on the specific implementation. In some embodiments, push notifications regarding the logged events 136 may be queued by the receiving component. One suitable implementation for queueing pushed notifications in the services platform 102 is Simple Queue Service (SQS), commercially available from Amazon® Technologies, Inc.

The component that periodically reads out the logged events 136 (e.g., the tagging service 126) may parse the pushed notifications, filter the events based on resource creation events, and extract identity data pertaining to the identified resource creation events. Continuing with the above example, if the creation of the database resource 104 resulted in a the log entry that specifies the entity 120(2) (e.g., "Team A") as the creator of the database resource 104, the identity data that is extracted from the associated resource creation event may include the unique user identity of the entity 120(2) (e.g., "user identity"="433775394192"). Other identity-related information may be extracted at this point as well, including, without limitation, the type of identity, an Internet Protocol (IP) address used for the resource creation request, and so on. Different identity types may be specified for registered entities 120, such as a root user, Identity and Access Management (JAM) user, JAM role, Web Identity Federation (WIF) user, or Security Assertion Markup Language (SAML) user, all of which are available on the Amazon® Web Services (AWS) platform, commercially available from Amazon® Technologies, Inc.

In some embodiments, after a resource creation event is identified from the read out logged events 136, a "friendly" name (e.g., a user name, such as "Team A") may be retrieved from the customer account 118. This friendly name may be associated with the database resource 104 along with the unique user identity. In this manner, the customer 106 may be presented with the friendly name as the output when the entity 120 is reported to the customer 106 as the creator of the database resource 104. In one example, the services platform 102 may maintain the association of the entity 120 with the created resource 104 using a creator tag 138 that is maintained in a repository of tags 140 by the tagging service 126. In other examples, other constructs, such as meta-tags, may be utilized to maintain or otherwise persist the creator-to-resource association for a created resource 104, which may be utilized by the billing service 128.

In the scenario where the creator-to-resource association is persisted in the form of the creator tag 138, the creator tag 138 may take any suitable form or structure. Generally, a tag, such as the creator tag 138, may comprise any sort of identifier that is associated with one of the resources 104. In some embodiments, a tag may comprise a tag name and an associated tag value(s) in a form that can be represented as name:value. Taking the creator tag 138 as an example, a particular resource 104, upon creation, might be assigned a tag value pair such as "CreatedBy:433775394192," indicating that the resource 104 was created by an entity 120 with a unique user identity of "433775394192." In some embodiments, the creator tag 138 may include additional fields, such as an identity type field to indicate the type of entity 120 (e.g., root user, federated user, etc.), and/or a field for the above-mentioned friendly name, which may comprise a user name (e.g., "Team A", "John Smith," etc.). Since the creator-to-resource association is automated within the services platform 102, the creator tag 138 may include a prefix that indicates the creator tag 126 was system-generated, as opposed to user-generated. For example, the creator tag 138 may include an "aws" prefix to indicate the creator tag 138 was system-generated (as opposed to user-generated). In this scenario, the prefix and name of the creator tag 138 may take the form of "aws:CreatedBy."

It is to be appreciated that other types of tags 140 may be generated and maintained by the tagging service 126 in addition to the creator tags 138. For example, user-generated or customer-created tags 140 may be created and assigned to respective resources 104 through the control plane 108, such as by explicitly specifying tags through calls to the APIs 110 or interactions with the GUI 112.

In some embodiments, the service 122 may call the tagging service 126 directly to generate the creator-to-resource association, rather than transmitting log entries to the API logger 124 to be recorded as logged events 136. Continuing with the previous example, a request to create the database resource 104 may cause invocation of a resource creation API, and in response to this invocation of the resource creation API, the service 122 may call the tagging service 126 directly to generate a creator tag 138 that specifies an entity 120 as the creator of the database resource 104. The entity 120 (e.g., an individual, application, group of individuals or group of applications) may be identified as the entity 120 that made an explicit request causing the resource creation API to be invoked. Alternatively, a programmatic entity, such as a parent resource 104 may have issued the request to create the database resource 104 on behalf of the customer 106. In this scenario, the designation of "resource creator" may be imputed to a particular entity 120 that initiated a workflow involving the parent resource 104 that issued the request. Alternatively, the resource creator designation may be imputed to an entity 120 that was explicitly designated by the customer 106 as the entity 120 that the parent resource 104 is permitted to create new resources 104 under. When a programmatic entity requests the creation of new resources 104, the request may be triggered by a monitored metric that reaches a threshold. In some cases, an initial resource creation request may be received by a first service 122, which, in turn, calls another service, and possibly many other services before a resource creation API is actually invoked. In this scenario, a particular entity 120 associated with the resource creation API and the terminal service (in the series of services) may be identified as the creator entity 120. In any case, once the creator tag 138 is generated and recorded in the repository of tags 140, the usage allocator 132 may retrieve the creator tag 138 to determine how to allocate usage for a particular resource 104.

In some embodiments, the tagging service 126 may be further configured to create usage allocation tags 140 that may supersede the creator-to-resource association (e.g., the creator tags 138). For example, if entity 120(1) is identified as the creator of the example database resource 104, and the association is automatically generated upon creation of the database resource 104, there may be situations where another entity 120(2) takes over the use of the database resource 104 partway through a billing period. In this scenario, a usage allocation tag 140 may be generated by the customer 106 using the tagging service 126, and the usage allocation tag 140 may be utilized to allocate any future usage and/or cost to the entity 120(2). For example, the billing service 128 may periodically (e.g., every hour) meter the use of the database resource 104, calculate the cost of operating the database resource 104, and identify an entity 120 to which the cost will be allocated for that period. Accordingly, for an initial portion of the billing period, the usage allocator 132 may retrieve the creator tag 138 to determine that the metered hours over the initial portion of the billing period are to be allocated to the entity 120(1), and for a latter portion of the billing period, the usage allocator 132 may retrieve the usage allocation tag 140 that supersedes the creator tag 138 to determine that the metered hours over the latter portion are to be allocated to the entity 120(2). As a result, the customer 106 may receive a usage allocation report that allocates some of the usage and/or cost of operating the database resource 104 to the entity 120(1), and some of the usage and/or cost to entity 120(2) for a given billing period.

Example Processes

The processes disclosed herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
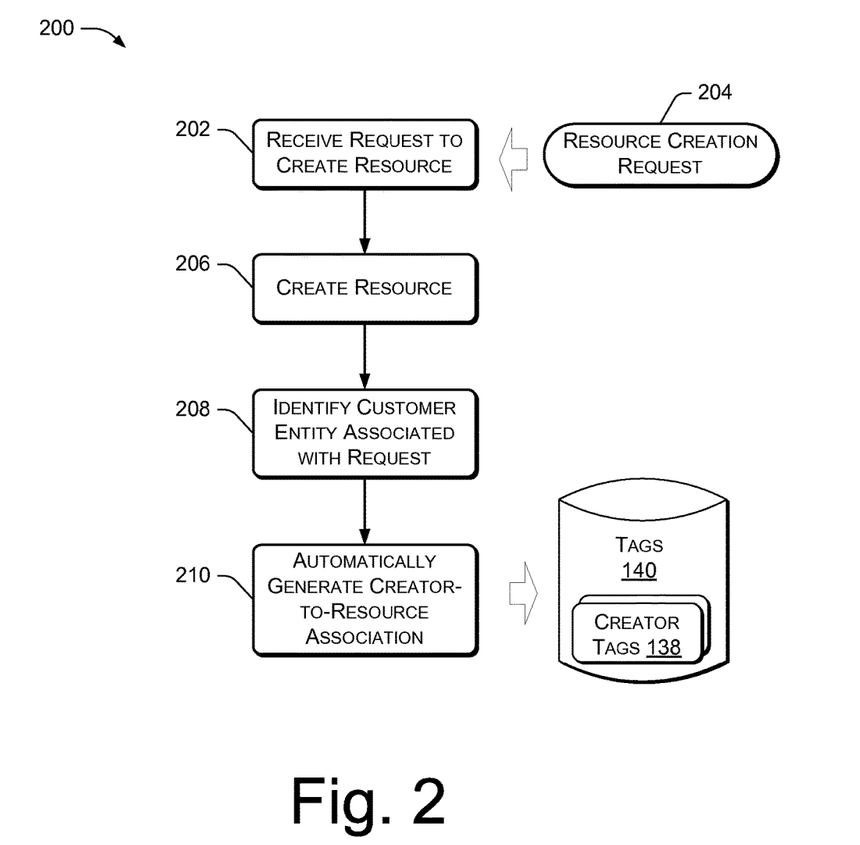
FIG. 2 is a flow diagram illustrating an example process of automatically associating a resource creator with a computing resource upon creation of the computing resource.

FIG. 2 is a flow diagram illustrating an example process 200 of automatically associating a resource creator with a computing resource 104 upon creation of the resource 104. For discussion purposes, the process 200 may be performed by or in conjunction with the services platform 102 of FIG. 1.

At 202, a resource creation request 204 may be received by the services platform 102. The resource creation request 204 may specify the characteristics of a resource 104 that is be by created for or on behalf of a customer 106. The resource creation request 204 may be created and supplied by an entity 120 of the customer 106, which may be an individual or a client-side programmatic entity (e.g., an application 120(N) or another customer resource) on behalf of the customer 106. As another example, certain situations may arise in which the resource creation request 204 is submitted by another resource 104, which may be referred to as a parent resource 104.

At 206, the services platform 102 may respond to the resource creation request 204 by creating the requested resource 104. At 208, the services platform 102 may identify an entity 120 that is associated with the resource creation request 204. For example, the entity 120 may be identified based on a determination that the entity 120 invoked a resource creation API resulting from an explicit request 204 from the entity 120. As another example, the entity 120 may be identified based on an inferred association through a parent resource 104 that issued the request 204. For example, an entity 120 that initiated a workflow involving the parent resource 104 may be identified at 208. Alternatively, the services platform 102 may respond to the request 204 by requesting the customer 106 to specify a particular entity 120. In this case, a user may enter a user name of a particular entity 120. In some cases, security credentials may be requested upon a user specification of the entity 120.

At 210, the services platform 102 may automatically associate the identified entity 120 with the created resource 104 by specifying the entity 120 as a creator of the computing resource 104. As noted above, this automatic association at 210 may be effected in various ways. FIG. 2 illustrates one example where the tagging service 126 is used to generate and store a creator tag 138. As mentioned above, the creator tag may comprise a name (e.g., "CreatedBy"), a value (e.g., a unique user identity of the entity 120, such as an alphanumeric identifier), and possibly other fields (e.g., a prefix to indicate the creator tag 138 is system-generated, an identity type for the entity 120, a friendly name for the entity 120, etc.). In other embodiments, the API logger 124 may be utilized to log a resource creation event in the repository of logged events 136 based on the resource creation request 204. This log entry may include a unique identity of an entity 120 that can be identified as the creator of the resource 104. This resource creation event may then be read out and the identity information may be extracted to associate the entity 120 with the created resource 104 at step 210 (e.g., by persisting a meta-tag construct within the services platform 102). Other suitable manners of automatically generating a creator-to-resource association at 210 may be utilized without changing the basic characteristics of the system.

The process 200 causes any resource 104 created through the services platform 102 to be automatically associated with a "resource creator." In this manner, all of the resources 104 may have their usage allocated to a specific entity 120 from the moment they are created in the services platform 102. The process 200 may result in an automated system-wide association of creators to resources that may be referenced by the customer 106 and the services platform 102 for various downstream functionality, as will be described in more detail below with reference to the following figures.

Figure 3:
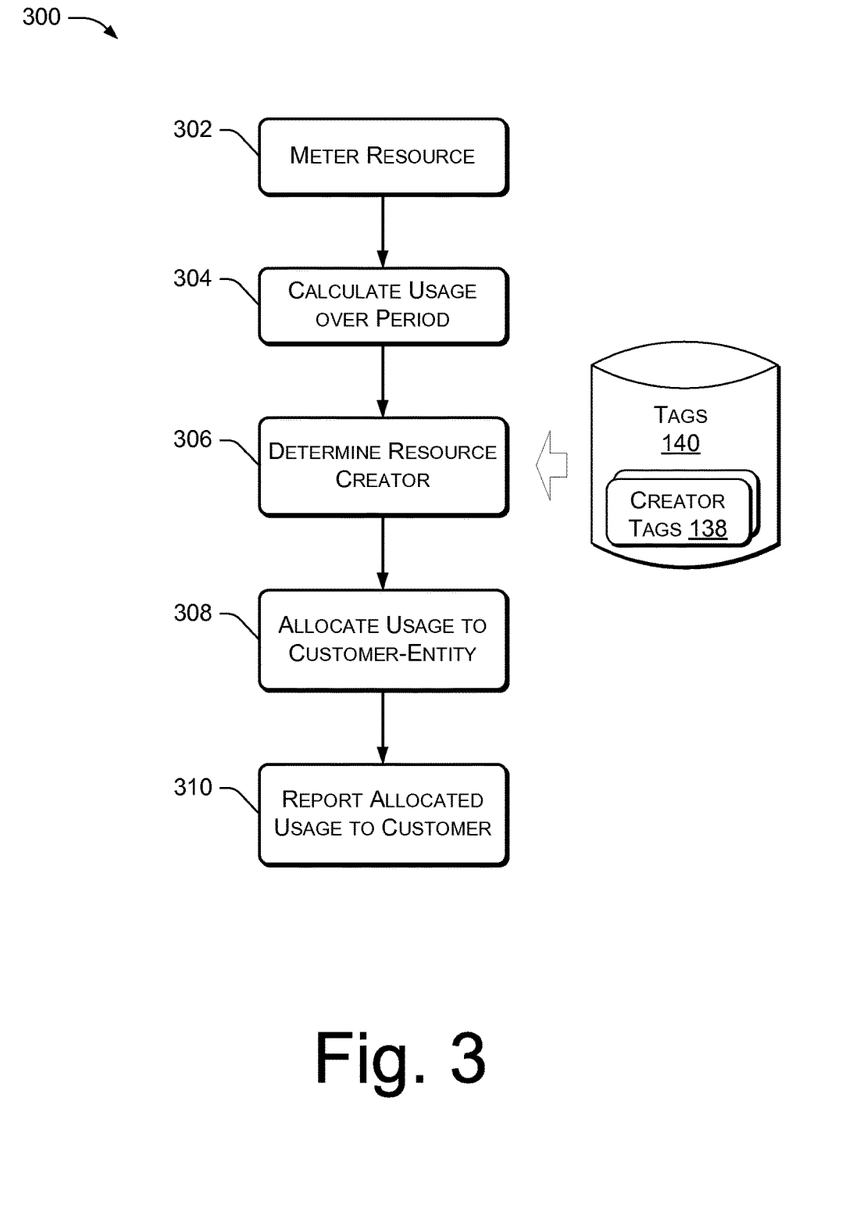
FIG. 3 is a flow diagram illustrating an example process of allocating resource usage of a computing resource to a resource creator.

FIG. 3 is a flow diagram illustrating an example process 300 of allocating the usage of operating a computing resource 104 to a resource creator. For discussion purposes, the process 300 may be performed by or in conjunction with the services platform 102 of FIG. 1.

At 302, the meter 130 of the billing service 128 may monitor the usage of a computing resource 104 over a period of time. For example, a database resource 104 may be launched and executed such that the use of that database resource 104 may be metered at 302 as the resource 104 is running within the services platform 102. The metering at 302 may be based on any suitable metric, such as a time period that the resource 104 runs, an amount of data utilized over a period of time, or a number of access requests for the resource 104, and so on.

At 304, the meter 130 may optionally calculate usage of the resource 104. The calculation at 304 may be a determination of the metered metric from 302, or the calculation at 304 may be a calculation of a cost of operating the resource 104, which may be calculated based on a service fee or rate (e.g., $/hour, GB/hour, etc.). After a period of time, which may coincide with a billing period, or may alternatively coincide with a sub-interval of the billing period, the usage allocator 132 may determine, at step 306, a particular entity 120 that is associated with the computing resource 104 as the creator of the resource 104. The determination at 306 may leverage the creator-to-resource association that was automatically generated at step 210 of the process 200 shown in FIG. 2. For example, FIG. 3 illustrates that the usage allocator 132 may retrieve a creator tag 138 or another persisted construct (e.g., a meta-tag) associated with the resource 104 in question.

At 308, the usage allocator 132 may allocate the metered usage of the resource 104 to the entity 120 identified at 306. In some embodiments, the cost of operating the resource 104 calculated at step 304 may be allocated at step 308. At 310, the reporting module 134 may provide a usage allocation report to the customer 106 showing the usage in association with the entity 120. Table 1, below, illustrates an example of a usage allocation report that may be provided to the customer 106 at step 310:

TABLE 1

| Total Cost | user:Owner | user:Stack | user:Cost Center | aws:CreatedBy |
|---|---|---|---|---|
| 0.95 | DbAdmin | Test | 80432 | Root:ABSHCYSIASJCSKA:John Smith |
| 3.84 | DbAdmin | Prod | 80431 | iamUser:AIDAEQ3ZTRHTZS:Jane Doe |
| 233.24 | SysEng | Prod | 80432 | FederatedUser:8376179101:feduser:Tyler V |

The resources 104 may appear in the usage allocation report itself, or, as shown in Table 1, the resources 104 may be deduced from tags 140 that are assigned to the resources such as tag of the name "Cost Center." In this case, at least two different resources 104 are shown in the example usage allocation report of Table 1 (e.g., one resource 104 tagged with "Cost Center"="80432", and another resource 104 tagged with "Cost Center"="80431"). Some of the column headings in the usage allocation report may comprise user-assigned tag keys, such as a "user:Owner" tag key, a "user:Stack" tag key, and/or a "user:Cost Center" tag key. Each line items value for those tag keys are listed in the rows of the usage allocation report of Table 1. At least one column heading (in this case, the far right column heading) may include a system-assigned tag key (e.g., "aws:CreatedBy") where the line item values within that far-right column indicate the entity 120 that is allocated the cost shown in the same row of the "Total Cost" column at the far left of Table 1.

Table 1 shows that the same resource 104 may be listed on multiple line items of the usage allocation report due to the fact that the cost of operating the resource 104 over the billing period may, in some instances, be allocated across multiple entities 120 for that billing period. For example, a root user with the friendly name of "John Smith" is shown as having been allocated 0.95 of the total cost of a resource 104 for the billing period, and federated user with the friendly name of "Tyler V" was allocated 233.24 of the total cost of the same resource 104 for the billing period. It is to be appreciated that Table 1 is but one illustrative example of how a usage allocation report may be presented to the customer 106, and the form of the usage allocation report is not limited to the example shown in Table 1.

In some embodiments, the billing service 128 may be configured to retrieve additional entity tags from the repository of tags 140 maintained by the tagging service 126. In this manner, other business dimensions of the customer 106 may be associated with the entity 120 that is allocated at least a portion of the usage of a resource 104. For example, the entity 120(1) may be associated with a particular department within the organization that the customer 106 represents, and that department, in turn, may be associated with a particular project (e.g., project "X"). These associations may be maintained in the form of the tags 140, and the tags may be retrieved by the usage allocator 132 in order to "breakdown" or otherwise organize or filter the usage allocation report by further business dimensions. For example, a cost of operating a resource 104 in question may be grouped by project, by department, and so on. This gives the customer 106 significantly more detail into the allocation of usage for resources 104 within the services platform 102. Other information that may be collected at the time of creating a new resource 104 may also be used to breakdown the usage allocation report across different dimensions, such as the region where the resource was created, a time of day that the resource was created, and so on. In some embodiments, the services platform 102 may integrate with a directory system of the customer 106 to obtain additional associations to the entity 120 (e.g., teams and organizational structure) that may be used for organizing the presentation of data in the usage allocation report.

Figure 4:
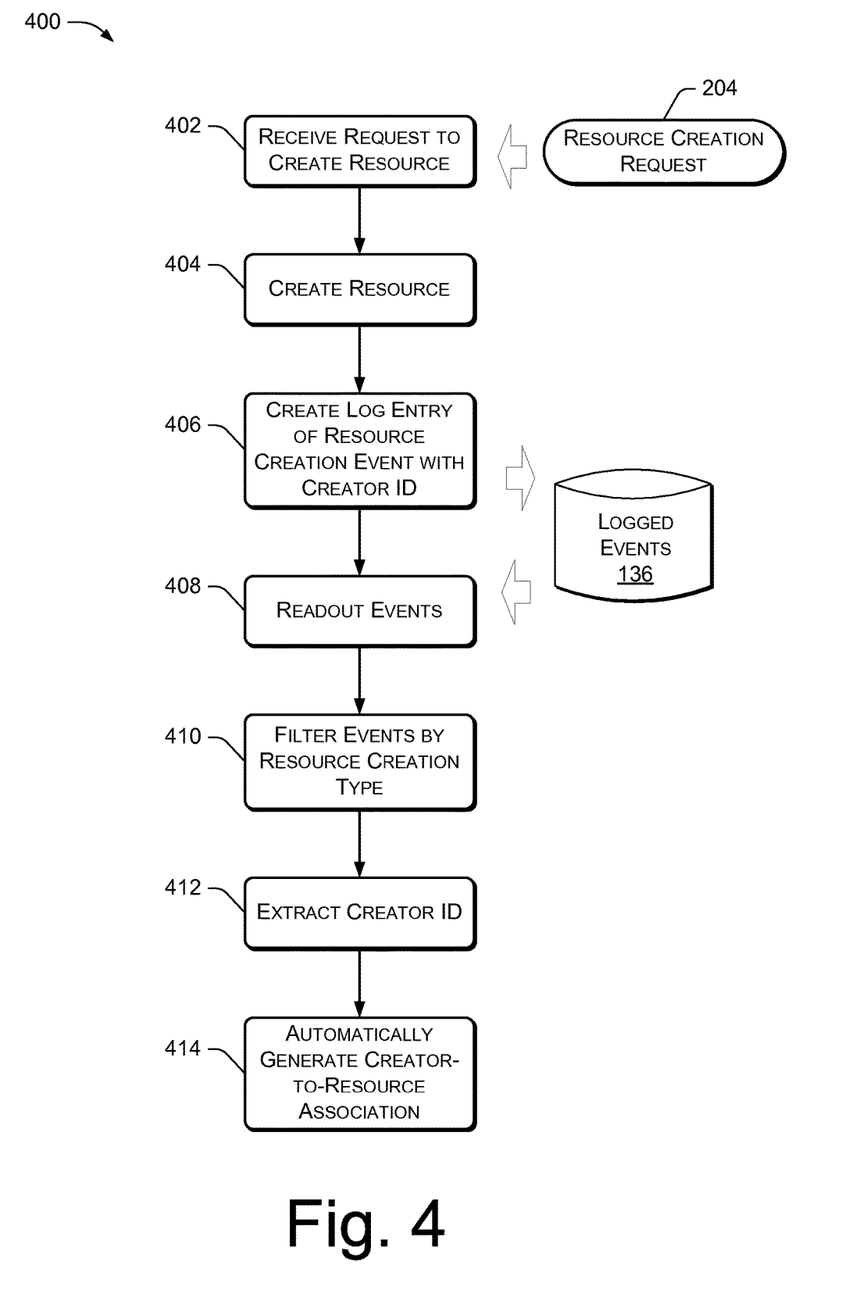
FIG. 4 is a flow diagram illustrating another example process of automatically associating a resource creator with a computing resource upon creation of the computing resource.

FIG. 4 is a flow diagram illustrating another example process 400 of automatically associating a resource creator with a computing resource 104 upon creation of the resource 104. For discussion purposes, the process 400 may be performed by or in conjunction with the services platform 102 of FIG. 1.

At 402, a resource creation request 204 may be received by the services platform 102. This may be similar to step 202 of the process 200 shown in FIG. 2. At 404, the services platform 102 may respond to the resource creation request 204 by creating the requested resource 104. This may be similar to step 206 of the process 200 shown in FIG. 2.

At 406, the services platform 102 may identify an entity 120 that is associated with the resource creation request 204 and may create a log entry of a resource creation event including the unique user identity of the entity 120. For example, FIG. 4 illustrates how the log entry may be recorded in a repository of logged events 136.

At 408, the services platform 102 may read out the logged events 136 from the repository maintained by the API logger 124. For example, push notifications received by the tagging service 126 may be parsed at 408. At 410, the events that are obtained at 408 may be filtered by resource creation event type. At 412, for a given resource creation event that is identified, a unique user identity associated with the resource creation event may be extracted. For example, a unique user identity of an entity 120 may be extracted at 412. In some embodiments, other identity information or data may be extracted, such as a type of identity (e.g., a root user, federated user, etc.).

At 414, the services platform 102 may automatically associate the identified entity 120 with the created resource 104 by specifying the entity 120 as a creator of the computing resource 104. In some embodiments, the association may be a billing service 128 construct (e.g., a meta-tag) that is persisted within the services platform 102 and that identifies the unique identity extracted at 412 as being the resource creator for the given resource 104. In other embodiments, a creator tag 138 may be generated at 414 from the extracted unique user identity, and stored in the repository of tags 140 maintained by the tagging service 126.

Figure 5:
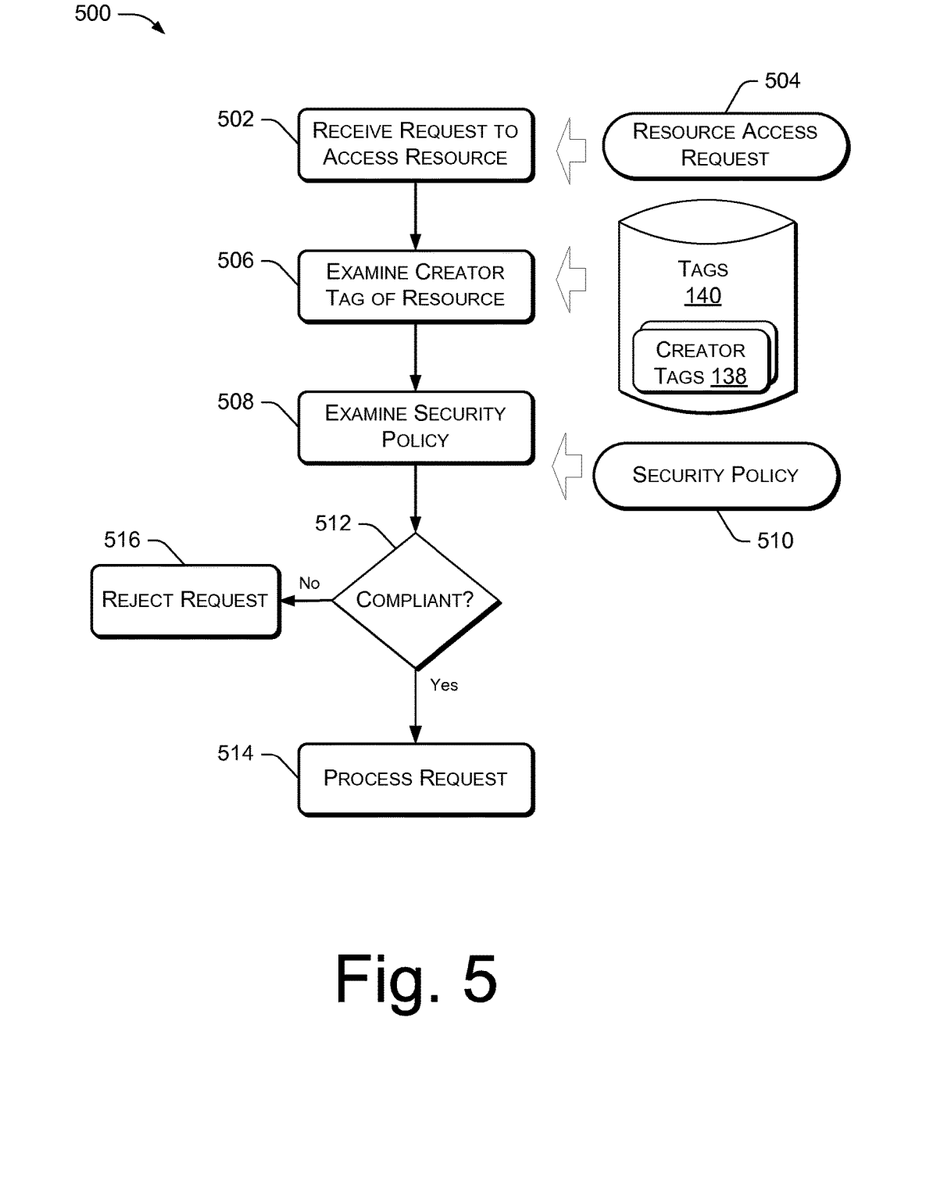
FIG. 5 is a flow diagram illustrating an example process of enforcing compliance with a security policy based on creator tags.

FIG. 5 is a flow diagram illustrating an example process 500 of enforcing compliance with a security policy based on creator tags 138. At 502, a resource access request 504 may be received by the services platform 102. The resource access request 504 may have been submitted from an entity 120 of the customer 106 via the GUI 112, for example.

At 506, the services platform 102 may retrieve and examine a creator tag 138 for the requested resource 104. The creator tag 138 may specify a particular entity 120 as the resource creator for the requested resource 104.

At 508, a security policy 510 may be examined to determine compliance of the request 504 with the security policy 510. The security policy 510 may specify that access to a resource 104 may be granted if the entity 120 associated with the resource access request 504 matches the entity 120 specified in the creator tag 138. Additionally, or alternatively, the security policy 510 may specify that certain entities 120 can only access resources 104 of a particular type or a particular cost (e.g., resources 104 below a certain dollar amount).

Accordingly, an action 512 comprises determining compliance of the request, based on the security policy 510 and on the creator tag 138. More specifically, the action 512 may comprise examining the creator tag 138 to determine whether the entity 120 specified in the creator tag 138 matches the entity 120 associated with the resource access request 504. The action 512 may additionally include determining whether the requested resource 104 complies with the security policy 510 for the entity 120 associated with the request 504.

If the request 504 is found to comply with the security policy 510, the request may be accepted and processed at 514. Otherwise, if the request 504 does not comply with the security policy 510, the request may be rejected at 516. Alternatively, the request 504 may be forwarded to the entity 120 that is specified in the creator tag 138 before it is finally rejected at 516, such as to seek approval of the creator entity 120 specified in the creator tag 138 when the requesting entity 120 is a different entity 120.

Figure 6:
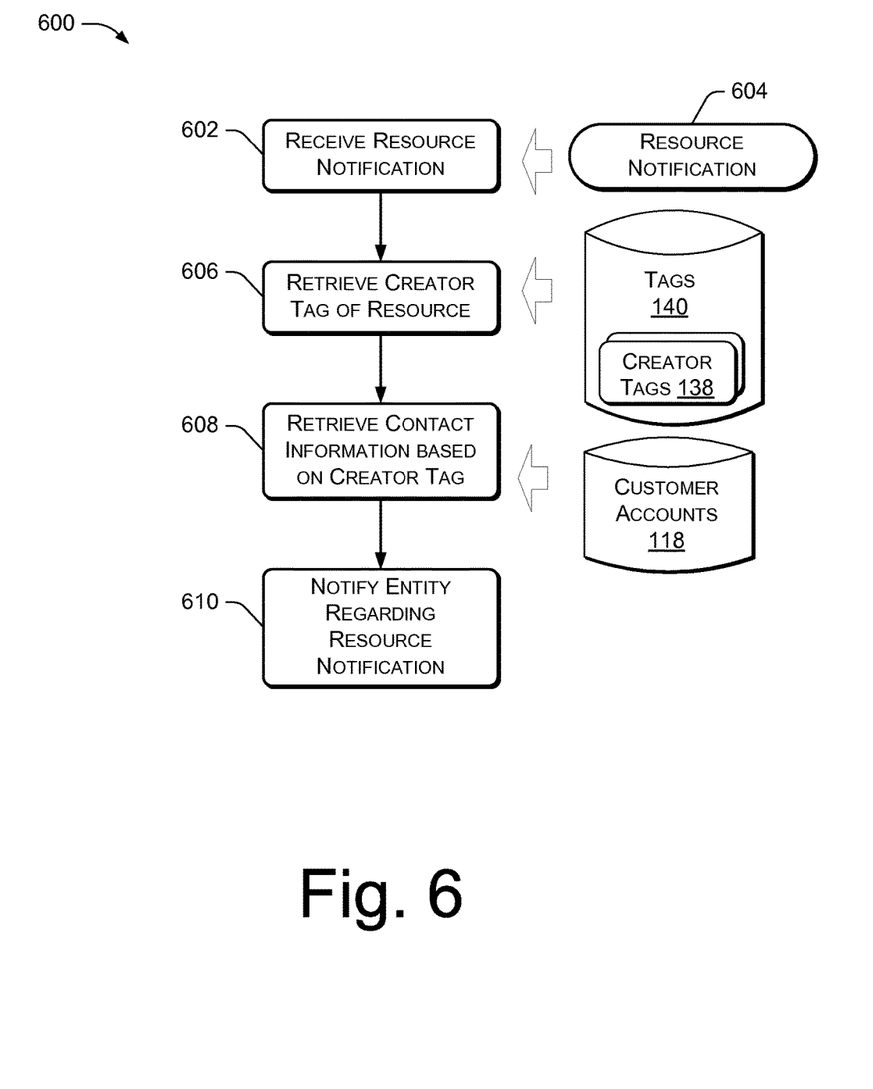
FIG. 6 is a flow diagram illustrating an example process of notifying an entity regarding a resource using creator tags.

FIG. 6. is a flow diagram illustrating an example process 600 of notifying an entity 120 regarding a resource 104 using creator tags 138. At 602, a resource notification 604 may be received by the services platform 102. For example, a datacenter outage may impact particular ones of the resources 104, such as machine instances that run on the physical machines of that datacenter that are part of the outage. The resource notification 604 may identify those impacted resources 104.

At 606, the services platform 102 may retrieve a creator tag 138 associated with a resource 104 specified in the resource notification 604. Particularly, the entity 120 that is specified as the creator of the resource 104 in question may be determined by examining the creator tag 138 of the resource 104.

At 608, contact information (e.g., an e-mail address) may be retrieved from the customer account 118 of the determined entity 120. In situations where the resource creator is a programmatic entity 120 (e.g., an application of the customer 106), the contact information for an associated human entity 120 may be retrieved.

At 610, the contact information retrieved at 608 may be utilized to notify the appropriate entity 120 regarding the resource notification 604. The process 600 may therefore provide notifications to appropriate personnel of the customer 106 rather than a customer-level notification.

Note that although the various functions described above have been attributed largely to the services platform 102, the described functionality may be allocated in different ways. Thus, in some embodiments the client 116 may perform functions that are described above as being implemented by the services platform 102. Similarly, the services platform 102 may perform functions that are described above as being implemented by the client 116. Furthermore, certain implementations may include additional elements or actors that perform some of the described actions.

Example Computer

Figure 7:
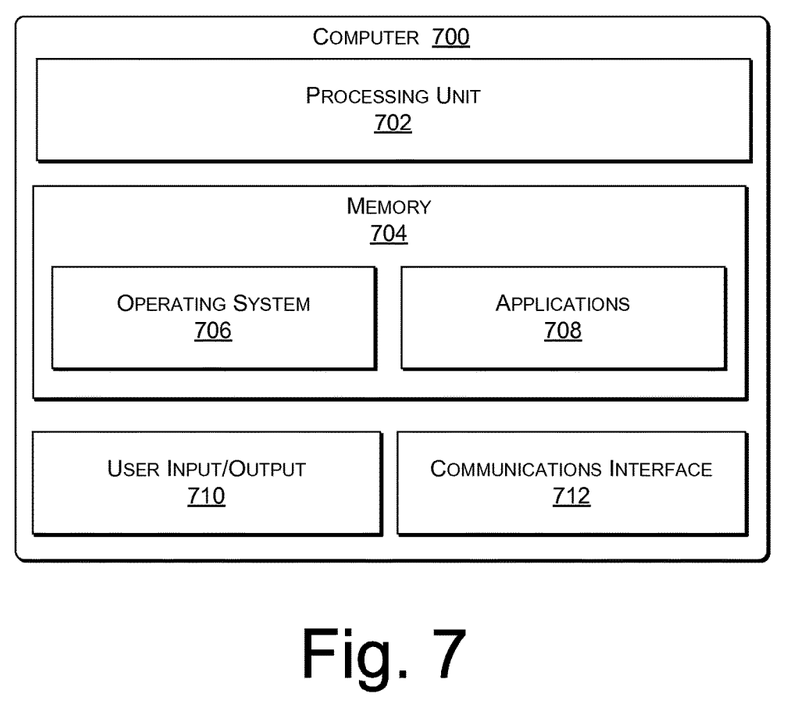
FIG. 7 is a block diagram showing high-level components of an example computer that may be used in conjunction with the systems and techniques described herein.

FIG. 7 shows relevant components of an example computer 700 that may be used to implement physical servers of the services platform 102 and/or to implement the client 116. The physical servers of the services platform 102 and the client 116 may of course be implemented in many different ways. Note that the client 116 comprise any number of various devices that may be used to access network-based services, such as desktop computers, notebook computers, tablet computers, terminals, personal digital assistants (PDAs), smartphones, gaming devices, entertainment devices, industrial controllers, and so forth.

The example computer 700 may comprise one or more processing units 702 and one or more forms of computer-readable memory 704. The memory 704 may comprise volatile and nonvolatile memory. Thus, the memory 704 may include, but is not limited to, random access memory (RAM), read only memory (ROM), electrically-erasable programmable ROM (EEPROM), flash memory, or other memory technology, or any other medium which can be used to store applications and data. The memory 704 may also include removable media such as optical disks, portable devices/drives, and so forth.

The memory 704 may be used to store any number of functional components, such as programs and program modules that are executable on the processing unit 702. For example, the memory may store an operating system 706 and various applications or user-specified programs 708. The operating system 706 and/or the user-specified programs 708 may include components, modules, and/or logic for performing the actions described herein. More specifically, executable components stored in the memory 704 may comprise computer-executable instructions that, when executed, cause the one or more processing units 702 to perform acts and to implement techniques described herein.

The computer 700 may also have user input/output components 710, such as a display, keyboard, mouse, etc. The computer 700 may also comprise a communications interface 712 such as a network interface.

Generally, the functionality described herein may be implemented by one or more computers such as shown by FIG. 7 or by similar devices, with the various actions described above distributed in various ways across the different computers. Computers of the services platform 102 may be located together or separately, and organized as virtual servers, server banks, and/or server farms. The described functionality may be provided by the computers of a single entity or enterprise, or may utilize the computers and/or services of multiple entities or enterprises.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
    invoking a resource creation application programming interface (API) to create a computing resource to be executed within a network-based services platform on behalf of a customer having a customer account with the network-based services platform, the customer account specifying a plurality of customer entities;
    creating the computing resource in response to the invoking of the resource creation API;

identifying a customer entity of the plurality of customer entities that is associated with the invoking of the resource creation API;

at least partly in response to identifying the customer entity, automatically associating the customer entity with the computing resource by specifying the customer entity as a creator of the computing resource, wherein the automatically associating comprises automatically persisting a creator tag for the computing resource, the creator tag comprising a tag name and a tag value, wherein the tag value identifies the customer entity and the tag name indicates that the computing resource was created by the customer entity identified by the tag value;

metering the computing resource as it executes within the network-based services platform;

determining a usage of the computing resource over a period of time based at least in part on the metering;

determining, based at least in part on the creator tag, that the customer entity is associated with the computing resource as the creator of the computing resource;

retrieving one or more entity tags associated with one or more business dimensions of the customer entity, wherein the one or more business dimensions comprises an organizational sub-group within the customer entity;

allocating the usage to the one or more business dimensions of the customer entity based at least in part on the determining that the customer entity is associated with the computing resource; and reporting the usage to the customer in association with the customer entity.

2. The one or more non-transitory computer-readable media of claim 1, the acts further comprising, prior to the automatically associating and in response to the invoking of the resource creation API:

creating a log entry for a resource creation event, the log entry specifying the customer entity as the creator of the computing resource;

adding the resource creation event to a repository of tracked events;

reading out a plurality of events from the repository of the tracked events;

filtering the plurality of events to identify at least the resource creation event; and extracting at least a unique identifier (ID) of the customer entity based at least in part on the resource creation event, wherein the automatically associating is based at least in part on the unique ID.

3. The one or more non-transitory computer-readable media of claim 2, wherein the tag value of the creator tag specifies the unique ID of the customer entity.

4. A method comprising:

maintaining a customer account on behalf of a customer of a network-based services platform, the customer account specifying a plurality of customer entities;

creating, by one or more computing devices of the network-based services platform, a resource in response to a request to create the resource, the resource to be executed within the network-based services platform;

identifying, by at least one of the one or more computing devices, a first customer entity of the plurality of customer entities that is associated with the request to create the resource;

at least partly in response to the identifying of the first customer entity, generating, by at least one of the one or more computing devices, a first association between the first customer entity and the resource, the first association specifying the first customer entity as a creator of the resource;

receiving, from a computing device of the customer, a request to allocate future usage of the resource to a second customer entity of the plurality of customer entities;

at least partly in response to the receiving of the request to allocate the future usage, generating, by at least one of the one or more computing devices, a second association between the second customer entity and the resource, the second association superseding the first association;

determining a total usage of the resource over a predetermined period of time after the creating of the resource;

retrieving one or more entity tags associated with one or more business dimensions of the customer entity, wherein the one or more business dimensions comprises an organizational sub-group within the customer entity;

apportioning a first portion of the total usage that occurred prior to the receiving of the request to allocate the future usage to the one or more business dimensions of the first customer entity based at least in part on the first association;

apportioning a second portion of the total usage that occurred after the receiving of the request to allocate the future usage to the second customer entity based at least in part on the second association superseding the first association; and reporting the first portion of the total usage and the second portion of the total usage to the customer.

5. The method of claim 4, wherein the total usage is determined based on metering at least one of an amount of time that the resource is used, an amount of data consumed while operating the resource, or a number of requests to access the resource.

6. The method of claim 4, wherein the generating of the second association comprises:

tagging the resource with a usage allocation tag.

7. The method of claim 4, further comprising retrieving a user name for the first customer entity, wherein the reporting includes presenting the user name for the first customer entity.

8. The method of claim 4, wherein the request to create the resource causes invoking of a resource creation application programming interface (API), and wherein the first customer entity is identified based at least in part on an association of the first customer entity with the invoking of the resource creation API.

9. The method of claim 4, wherein the request to create the resource is programmatically provided by a parent resource on behalf of the customer, and the first customer entity is identified based at least in part on the first customer entity having initiated a workflow for the parent resource.

10. The method of claim 4, further comprising, prior to the generating of the first association and in response to receipt of the request to create the resource:

creating a log entry for a resource creation event, the log entry specifying the first customer entity as the creator of the resource;

adding the resource creation event to a repository of tracked events;

reading out a plurality of events from the repository of the tracked events;

filtering the plurality of events to identify at least the resource creation event; and extracting at least a unique identifier (ID) of the first customer entity based at least in part on the resource creation event, wherein the generating of the first association is based at least in part on the unique ID.

11. The method of claim 4, wherein the generating of the first association comprises automatically tagging the resource with a creator tag specifying the first customer entity as the creator of the resource.

12. The method of claim 11, further comprising:

receiving a request for access to the resource;

examining the creator tag to determine compliance with a security policy that specifies access rights of the plurality of customer entities to resources that are operated by the network-based services platform on behalf of the customer; and enforcing compliance with the security policy based at least in part on the examining.

13. The method of claim 11, further comprising:

receiving a notification of a problem involving the resource;

retrieving the creator tag associated with the resource;

retrieving contact information of the first customer entity based at least in part on the creator tag; and notifying the first customer entity of the problem using the contact information.

14. A network-based services platform comprising:

one or more computing devices including one or more processors; and memory storing computer-executable instructions that, when executed, cause the one or more processors to:

create a resource in response to a request to create the resource, the resource to be executed within the network-based services platform;

operate the resource on behalf of a customer having a customer account specifying a plurality of customer entities;

identify a first customer entity of the plurality of customer entities that is associated with the request to create the resource;

at least partly in response to identifying the first customer entity, generate a first association between the first customer entity and the resource, the first association specifying the first customer entity as a creator of the resource;

receive, from a computing device of the customer during a predetermined period of time after the resource is created, a request to allocate future usage of the resource to a second customer entity of the plurality of customer entities;

at least partly in response to receiving the request to allocate the future usage, generate a second association between the second customer entity and the resource, the second association superseding the first association;

determine a total usage of the resource over the predetermined period of time;

retrieve one or more entity tags associated with one or more business dimensions of the customer entity, wherein the one or more business dimensions comprises an organizational sub-group within the customer entity;

apportion a first portion of the total usage to the one or more business dimensions of the first customer entity based at least in part on the first association;

apportion a second portion of the total usage to the second customer entity; and report the first portion of the total usage and the second portion of the total usage to the customer.

15. The network-based services platform of claim 14, wherein the total usage is determined based on metering at least one of an amount of time that the resource is used, an amount of data consumed while operating the resource, or a number of requests to access the resource.

16. The network-based services platform of claim 14, wherein the generating the first association comprises automatically tagging the resource with a creator tag specifying the first customer entity as the creator of the resource.

17. The network-based services platform of claim 14, wherein the request to create the resource causes invoking of a resource creation application programming interface (API), and wherein the first customer entity is identified based on an association of the first customer entity with the invoking of the resource creation API.

18. The network-based services platform of claim 14, wherein the request to create the resource is programmatically provided by a parent resource on behalf of the customer, and the first customer entity is identified as having initiated a workflow for the parent resource.

19. The network-based services platform of claim 14, wherein the computer-executable instructions, when executed, further cause the one or more processors to:

receive a log entry for a resource creation event, the log entry specifying the first customer entity as the creator of the resource;

add the resource creation event to a repository of tracked events, read out a plurality of events from the repository of the tracked events;

filter the plurality of events to identify at least the resource creation event; and extract at least a unique identifier (ID) of the first customer entity based on the resource creation event, wherein generating the first association is based at least in part on the unique ID.

* * * * *